Sept. 10, 1957  M. LUDWIG  2,805,491
TEMPERATURE CONTROL SYSTEM FOR CATALYST ELEVATOR
Filed Jan. 4, 1955
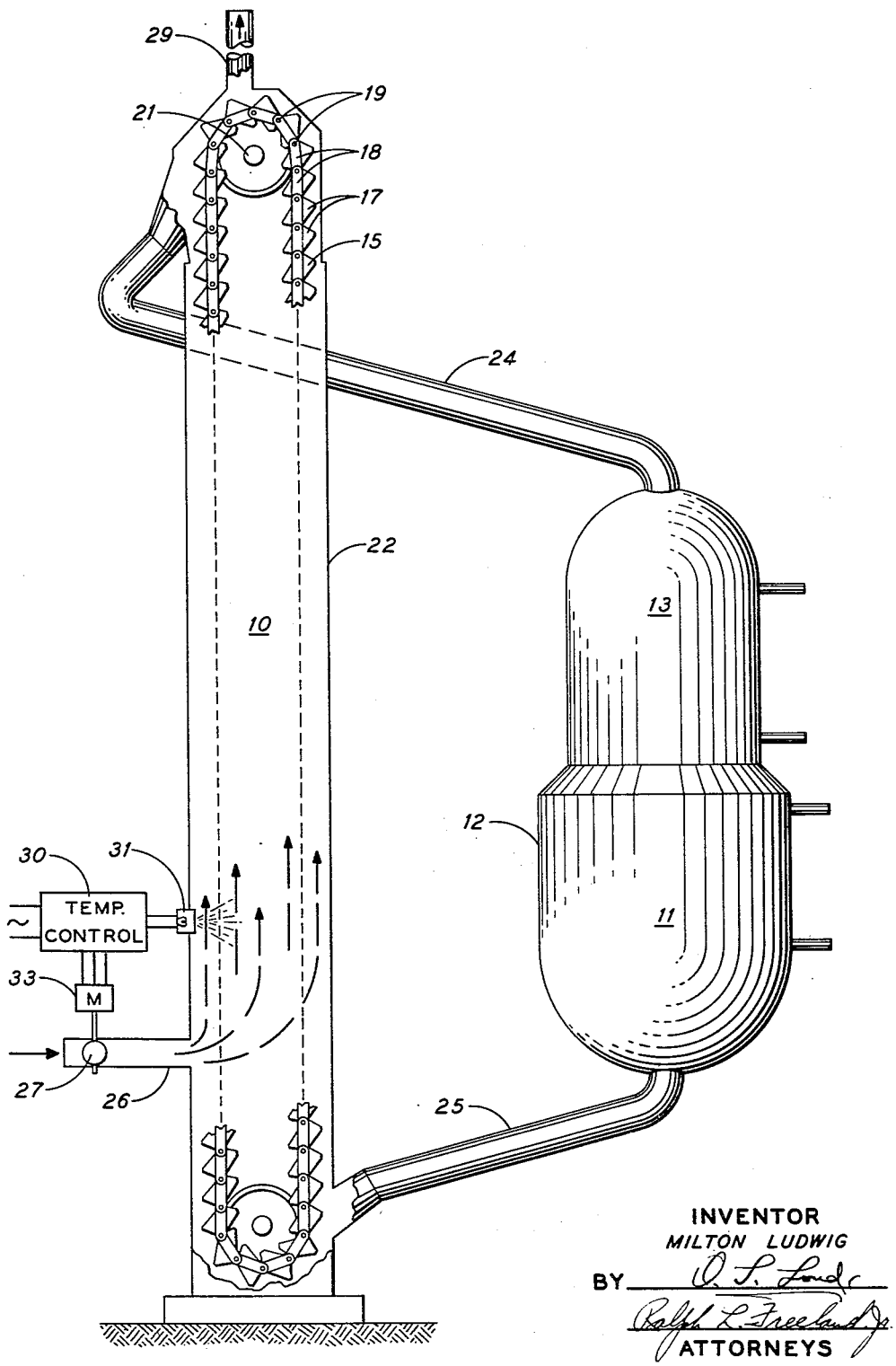
INVENTOR
MILTON LUDWIG
BY
ATTORNEYS

United States Patent Office 2,805,491
Patented Sept. 10, 1957

2,805,491

TEMPERATURE CONTROL SYSTEM FOR CATALYST ELEVATOR

Milton Ludwig, Kensington, Calif., assignor, by mesne assignments, to California Research Corporation, San Francisco, Calif., a corporation of Delaware Application January 4, 1955, Serial No. 479,722

1 Claim. (Cl. 34—54)

The present invention rellates to a method of and apparatus for controlling the temperature of an endless, bucket-type elevator system, more particularly to a method of maintaining the temperature of an elevator system adapted to convey hot catalyst material below a predetermined value, and has for an object the provision of a method for controlling the temperature of an enclosed elevator system which includes the steps of forming a flow path for a cooling agent in a lower portion of the elevator enclosure, forming another flow path for said cooling agent in an upper portion of said enclosure and varying amount of said cooling agent flowing through said housing to maintain the temperature of the elevator system at a desired value, without adverse effect upon the temperature of the hot catalyst material.

In the catalytic reaction of hydrocarbons, catalyst material, generally in bead form, is heated prior to its introduction into a reaction zone. Normally, such catalyst material after reaction is again heated in a regeneration zone, which is directly connected to the reaction zone to form a continuous system. In such systems, advantage is taken of gravity to flow the catalyst material through the reaction and regeneration zones. Accordingly, it is necessary to employ an elevator system to lift the heated and regenerated catalyst to the top of the reaction zone. While air lifting of the catalyst has been employed, the rate of attrition and loss of catalyst material has made such an elevator system less attractive from an economic standpoint than endless bucket-type elevator systems used for the conveying of hot catalyst.

In order to control the temperature of the heated catalyst and prevent undue heat loss during its transportation through the elevator, as well as for reasons of safety for plant personnel, the hot catalyst elevator is operated within an enclosure wherein the operating temperature of the elevator system is in the neighborhod of 1000° F. Accordingly, the temperature of the metal parts of the drive mechanism, including the links, through which the chain of buckets are interconnected to form an endless conveyor, are subjected to temperature conditions which reduce the yield strength of the metal and reduces the load which may be applied at the operating temperature.

In accordance with the present invention, there is provided a method of operating an enclosed, endless bucket-type elevator system for conveying hot catalyst material which permits control of the temperature of the elevator system without adverse effect on the temperature of hot catalyst material by regulation of the rate of flow of a cooling agent through the elevator housing. In a preferred form of apparatus for carrying out the method, an opening to the atmosphere is formed in a lower portion of the elevator enclosure and an additional opening is formed in the upper portion of the enclosure to permit material being elevated through the housing to generate a convection current of air which may be controlled by varying the size of one of the openings to maintain the temperature of the elevator at the desired value without adverse effect upon the temperature of the catalyst material.

Further objects and advantages of the present invention will become apparent from the following detailed disclosure taken in conjunction with the accompanying drawing which forms an integral part of the present specification.

In the drawing, there is shown a diagrammatic representation of a preferred form of the present invention, as applied to the control of temperature for an endless bucket-type elevator system utilized in conveying hot, regenerated catalyst from the lower part of a regeneration zone to the upper portion of a reaction zone.

Referring now to the drawing, the present invention has been illustrated as being applied to an endless, bucket-type elevator system 10 for conveying heated, and regenerated, catalyst at about 1000° F. from the regeneration section 11 in vesel 12 to reaction section 13 to permit gravity feed of the catalyst through vesel 12. The present invention is particularly directed to control of the temperature of the metal portions of endless bucket elevator 15, which include a plurality of metal lift buckets 17, continuously joined together by the metal drive linkages 18 and pins 19. Rotation of the endless bucket elevator 15 is provided by head shaft and drive wheel assembly 21 located in the upper portion of housing 22. As shown, housing 22 surrounds the endless bucket elevator system to reduce heat radiation losses from the heated catalyst material which is introduced through conduit 25 leading from the bottom of regeneration zone 11 into the lower portion of housing 22.

As indicated hereinabove, enclosure 22 surrounding elevator system 10, while preventing heat loss from catalyst material, greatly increases the operating temperature of the mechanical drive linkages including chains 18 and pins 19, as well as drive shaft and head wheel assembly 21. After a prolonged period of operation at such elevated temperatures and under load conditions, the linkages 18, even when made of heat resistant steel alloys, become elongated and weakened to an extent which, if permitted to continue, may result in breakage. To prevent such weakening or breakage and yet maintain the temperature of catalyst conveyed in the elevator system at a desired value, there has been provided in accordance with the invention a control system adapted to reduce the temperature of metal portions of the elevator to a desired value without adverse effect upon the temperature of the hot catalyst material. To this end, an opening is formed in the lower portion of elevator housing 22 by conduit 26, within which there is provided a flow control means, such as damper 27. Damper 27 is adapted to regulate the flow of air into and through housing 22. In order to establish flow of a cooling agent through housing 22, an additional opening in the upper portion of housing 22 is formed by the stack 29.

In accordance with a preferred manner of operating the temperature control system, the heat of the catalyst material being conveyed within housing 22 is utilized as the driving means for coolant therethrough by generation of an upwardly flowing convection current of air. Said convection current is generated by the admission of atmospheric air through conduit 26 and controlled by opening of damper 27 to regulate the rate of air flow. As illustrated, the flow rate may be regulated by temperature controller 30, operating in response to the temperature of chain 15, as measured by a temperature sensitive element, indicated as pyrometer 31. As shown, the output of temperature controller 30 adjusts the position of damper 27 by rotation of drive motor 33 to open or close conduit 26. Thus, it will be seen that the size of the opening through conduit 26 may be adjusted to maintain the temperature of the elevator at a desired value while, at the same time, the induced air current does not adversely affect the temperature of the hot catalyst material being conveyed therethrough.

Alternative to the arrangement of the flow openings 26 and 29 through enclosing housing 22, whereby atmospheric air is conveyed by the convection currents generated by the hot catalyst, the cooling agent may be steam or other gas introduced under pressure into the upper end of housing 22. Withdrawal of such gas is then through the lower opening in the enclosing housing due to the pressure difference through the length of the enclosure. While the cost of steam is greater than air, the steam has an additional advantage in some installations in that it is opaque to infrared radiation. Thus, with steam as the coolant, heat radiated by the hot catalyst which is normally within the infrared region is absorbed to provide an additional mode for absorbing heat that otherwise would radiate to endless conveyor chain 15. It will thus be seen that steam flowing from the upper portion of the housing to the lower portion is able to serve as the cooling agent by the absorption of heat from the metal portions of the elevator system by both radiation and convection. Obviously, steam may be introduced at either end and withdrawn from the opposite end.

A further alternative, as a cooling agent for maintaining the temperature of the metal portions of an elevator system at its desired value, is provided by the introduction of water into the lower portion of the elevator housing. Water may be sprayed directly on the elevator linkages 18 so that steam is generated upon contact. Such steam is then driven upward by heat derived from the catalyst and withdrawn from the upper portion of the housing 22 through the stack 29. The flow of cooling water may also be provided through either the upper or lower conduit and the resulting steam withdrawn from the opposite end of housing 22.

It will be understood, of course, that suitable valves, controlled to open and close in the same manner as damper 27, will be used for the introduction of either steam into the upper portion of housing 22, or water into the lower portion of the housing, in the last two described alternative control systems.

It will, therefore, be understood that the present invention contemplates control of the temperature of an endless bucket-type elevator system for hot catalyst material wherein openings are formed in the upper and lower portions of the enclosing housing, while such openings are utilized to provide a flow path through the enclosure whereby the temperature of the elevator may be maintained at a desired value and without adverse effect upon the temperature of the hot catalyst material by varying the amount of said cooling agent permitted to flow through the housing.

While various modifications and changes in both the method and apparatus for controlling temperature of a bucket-type elevator for hot catalyst will occur to those skilled in the art from the foregoing description, all such modifications and changes falling within the scope of the appended claim are intended to be included therein.

I claim:

In an elevator apparatus for conveying regenerated catalyst from a lower level to an upper level while said catalyst is at an elevated temperature comprising a head shaft, a plurality of lift buckets continuously joined together by drive linkages to form an endless conveyor, said endless conveyor being driven by said head shaft through said drive linkages, an enclosing housing extending throughout the length of said elevator system, means for receiving heated catalyst in the lower end thereof, means for discharging catalyst from the upper end thereof, means for cooling the drive linkage, comprising first conduit means forming an exhaust stack extending upwardly from the upper portion of said housing, second conduit means open to the atmosphere forming an air inlet in the lower portion of said housing, and radiation sensitive means responsive to the temperature of the drive linkage for controlling the flow of air through one of said conduit means to maintain the temperature of said drive linkages for said buckets at a predeterminable temperature below the catalyst temperature.

References Cited in the file of this patent

UNITED STATES PATENTS

| | | |
|---|---|---|
| 864,186 | Ostertag | Aug. 27, 1907 |
| 1,502,186 | Greenwood | July 22, 1924 |
| 1,738,890 | Goodrich | Dec. 10, 1929 |
| 1,844,782 | Mittag | Feb. 9, 1932 |
| 2,275,442 | Kennedy | Mar. 10, 1942 |
| 2,331,938 | Schutte | Oct. 19, 1943 |
| 2,409,376 | Mekler | Oct. 15, 1946 |
| 2,471,398 | Simpson et al. | May 24, 1949 |
| 2,490,774 | Bland | Dec. 13, 1949 |
| 2,531,192 | Bergstrom | Nov. 21, 1950 |
| 2,676,095 | Vaney et al. | Apr. 20, 1954 |